United States Patent [19]
Tani et al.

[11] Patent Number: 5,686,970
[45] Date of Patent: Nov. 11, 1997

[54] AVERAGE LUMINANCE LEVEL DETECTION APPARATUS AND ASPECT RATIO AUTO-DISCRIMINATION APPARATUS FOR A TELEVISION SIGNAL USING THE SAME

[75] Inventors: Masahiro Tani, Daito; Naoji Okumura, Minou, both of Japan

[73] Assignee: Matsushita Electric Industrial Co., Ltd., Osaka, Japan

[21] Appl. No.: 569,278

[22] Filed: Dec. 8, 1995

[30] Foreign Application Priority Data

Dec. 8, 1994 [JP] Japan ..................... 6-304670

[51] Int. Cl.$^6$ ..................................... H04N 5/46
[52] U.S. Cl. ........................ 348/558; 348/913; 348/556
[58] Field of Search ................... 348/554, 555, 348/556, 558, 557, 913; H04N 5/46

[56] References Cited

U.S. PATENT DOCUMENTS 5,420,644  5/1995  Watanabe ........................ 348/588

Primary Examiner—Michael H. Lee
Assistant Examiner—Vivek Srivastava
Attorney, Agent, or Firm—Ratner & Prestia

[57] ABSTRACT

A high precision aspect ratio auto-discrimination apparatus used for display apparatuses and television receivers comprising: an apparatus for detecting the upper edge and lower edge of a letter box picture through detecting the average luminance of every horizontal scan period; an apparatus for detecting respective average luminance levels in a plurality of specific regions in one field picture controlled by a horizontal synchronous signal and a vertical synchronous signal; and, an aspect ratio discrimination section to which the outputs of said both apparatuses are input.

5 Claims, 7 Drawing Sheets

AVERAGE LUMINANCE LEVEL DETECTION APPARATUS AND ASPECT RATIO AUTO-DISCRIMINATION APPARATUS FOR A TELEVISION SIGNAL USING THE SAME

BACKGROUND OF THE INVENTION

The present invention relates to an average luminance level detection apparatus for detecting an average luminance level in a specific region in the picture of one field of an video signal obtained from television receivers or VCR, and to an aspect ratio auto-discrimination apparatus using said average luminance level detection apparatus.

Recently, wide screen displays such as ones of aspect ratio 16:9 used in wide screen television receivers and Hi-Vision television receivers (high definition television receivers in Japan) have been spread. To utilize the display such as of aspect ratio 16:9 effectively, aspect ratio auto-discrimination apparatuses for discriminating the aspect ratio of a video signal automatically to change picture display regions has become important.

Hereafter an aspect ratio auto-discrimination apparatus in the prior art will be illustrated referring to FIG. 6 and FIG. 7. FIG. 6 is a block diagram of an aspect ratio auto-discrimination apparatus in the prior art, and FIG. 7 shows the relation between input video signal and luminance distribution. In FIG. 6, 12 is an integration circuit for integrating digitalized luminance signal Y for one horizontal scan period, 13 is a division circuit for dividing the output of integration circuit 12 by a simple number of the integration, 14 is a comparator circuit for comparing the output of division circuit 13 and a predetermined reference value, 15 is an edge detection circuit for detecting picture upper edge position 23 and picture lower edge position 24 in such a picture of a letter box signal as of an aspect ratio 16:9 as shown in FIG. 7(a), through inputting the output of comparator circuit 14 for one field picture period, 131 is an aspect ratio discrimination section for discriminating the aspect ratio and is input the output of edge detection circuit 15.

Performance of an aspect ratio auto-discrimination apparatus in the prior art constituted as described above will be illustrated referring to FIG. 6 and FIG. 7(a).

First, a digital luminance signal Y is integrated by integration circuit 12 every horizontal scanning period. The value after the integration is divided by division circuit 13 to calculate an average luminance level in every horizontal scanning period. The calculated average luminance level and a predetermined reference value are compared in comparator circuit 14 and judged whether the luminance level is higher or lower than the reference value. This result is input to edge detecting circuit 15 for one field period to obtain picture upper edge position 23 and picture lower edge position 24 as shown in FIG. 7(a), and the vertical size of the picture is calculated from the upper edge position information and the lower edge position information, and that said luminance signal Y is a letter box signal can be detected. However, with the above constitution, when the picture is special as shown in FIG. 7(b), even if the aspect ratio of an input signal is 4:3, false picture upper edge position 23' and false picture lower edgeposition 24' are detected and the signal which should be properly judged as a video signal of aspect ratio 4:3 is miss judged as a letter box signal.

SUMMERY OF THE INVENTION

Considering above problem, the invention provides an average luminance level detecting apparatus for improving the discrimination rate of an aspect ratio auto-detecting apparatus by detecting average luminance level in a plurality of vertical specific regions of a video signal, and an aspect ratio auto-detecting apparatus including the average luminance level detecting apparatus as a constitutional element.

[EXPLANATION OF THE MARKS]

Figure 1:
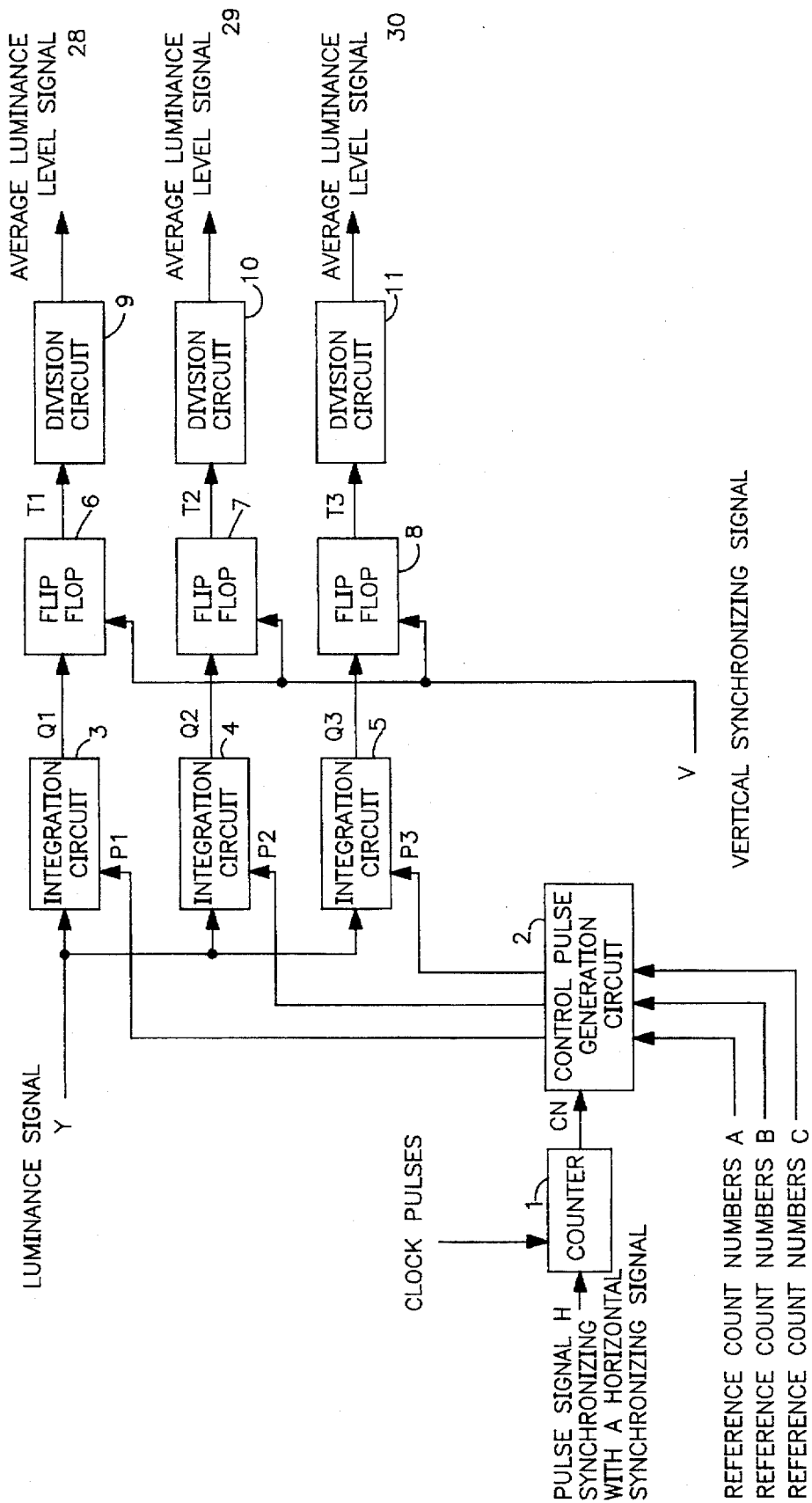
FIG. 1 is a block diagram of an average luminance level detection apparatus of a first embodiment of the invention.

1: counter
2: control pulse generation circuit
3, 4, 5, 12: integration circuit
6, 7, 8, 16: flip-flop
9, 10, 11, 13: division circuit
14: comparator circuit
15: edge detection circuit
17, 18, 19: coincidence detection circuit
20, 21, 22: average luminance level detection region
23: picture upper edge position of a letter box signal
23': false picture upper edge position
24: picture lower edge position of a letter box signal
24': false picture lower edge position
25: average luminance level detection apparatus of the invention
26: aspect ratio discrimination section
27: edge detection section constituting an aspect ratio auto-discrimination apparatus in the prior art
28, 29, 30: average level signal
31: aspect ratio discrimination section in the prior art

EXEMPLARY EMBODIMENT

A 1ST EMBODIMENT

An average luminance level detection apparatus which is a first embodiment of the invention comprises: three integration circuits; three flip-flops; three division circuits; a counter; and a control pulse generation circuit. In the above constitution, a digital luminance signal Y is input to three integration circuits, there the luminance signals in respective different regions are integrated, and each of obtained integration results is latched in each of the flip-flops, and the results are divided by division circuits by the number of samples integrated. As a result, the average luminance levels of the one field intervals in three regions can be detected. Since three regions are respectively set at the center portion of the picture, near the left end of the picture, and near the right end of the picture. The reason why the region is set in the center portion of the picture is that the signal in FIG. 7(b) should not be misjudged because it has a high probability that images like human's face appear in the center portion of picture found in many television pictures. The constitution of an average luminance level detection apparatus of the first embodiment of the invention will be illustrated referring to drawings. FIG. 1 is a block diagram of an average luminance level detection apparatus of the first embodiment of the invention. Said average luminance level detection apparatus comprises: a counter 1 to which a pulse signal H synchronizing with a horizontal synchronizing signal is input as a reset input; a control pulse generation circuit 2 to which the count output CN of said counter 1 is input; a first integration circuit 3 to which a luminance signal Y and a first output P1 of said control pulse generation circuit 2 are input; a second integration circuit 4 to which the luminance signal Y and a second output P2 of said control pulse generation circuit 2 are input; a third integration circuit 5 to which the luminance signal Y and a third output P3 of said control pulse generation circuit 2 are input; a first flip-flop 6 to which the output Q1 of said first integration circuit 3 and a vertical synchronizing signal V as a trigger input are input; a second flip-flop 7 to which the output Q2 of said second integration circuit 4 and the vertical synchronizing signal V as the trigger input are input; a third flip-flop 8 to which the output Q3 of said third integration circuit 5 and the vertical synchronizing signal V as the trigger input are input; a first division circuit 9 to which the output T1 of said first flip-flop is input; a second division circuit 10 to which the output T2 of said second flip-flop is input; a third division circuit 11 to which the output T3 of said third flip-flop is input.

Figure 2:
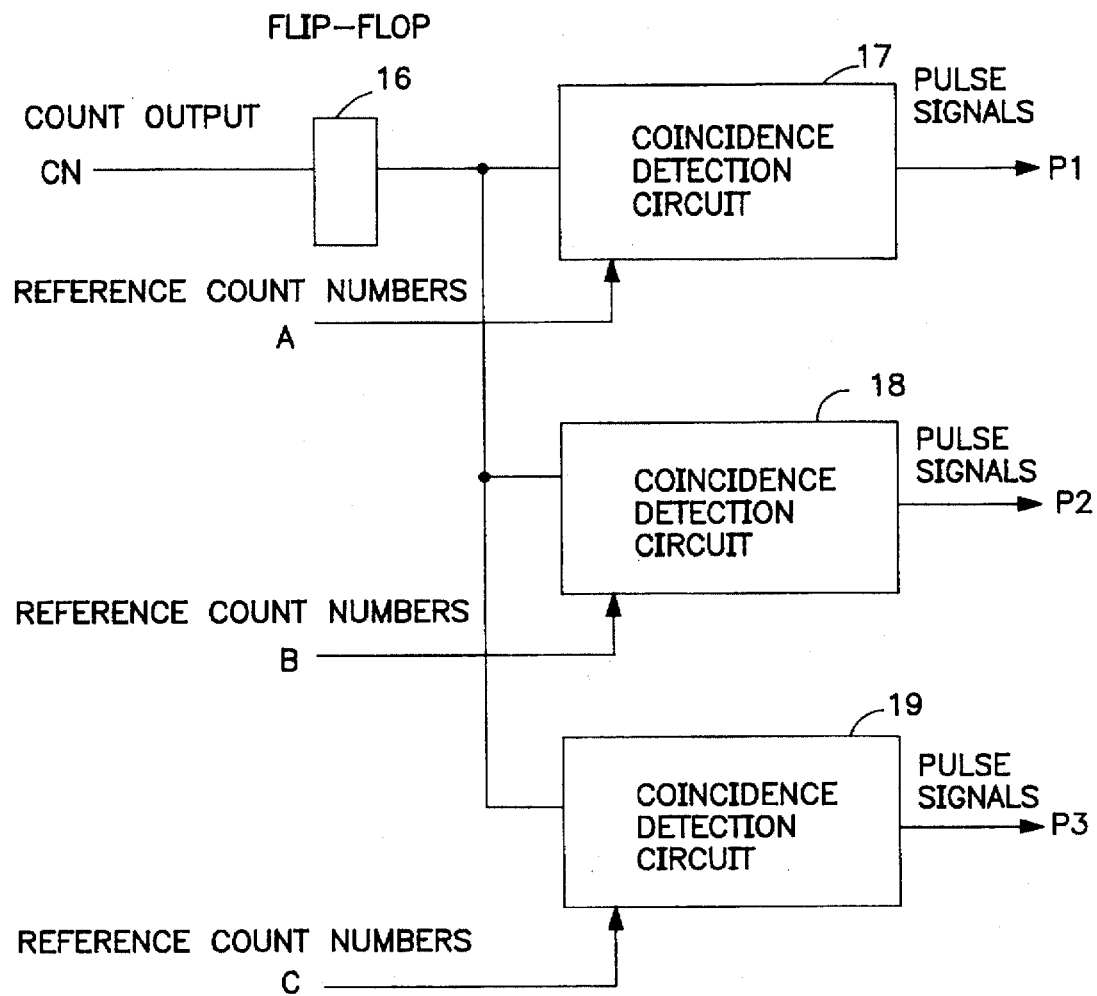
FIG. 2 is a block diagram of a control pulse generation circuit of the first embodiment of the invention.
Figure 3:
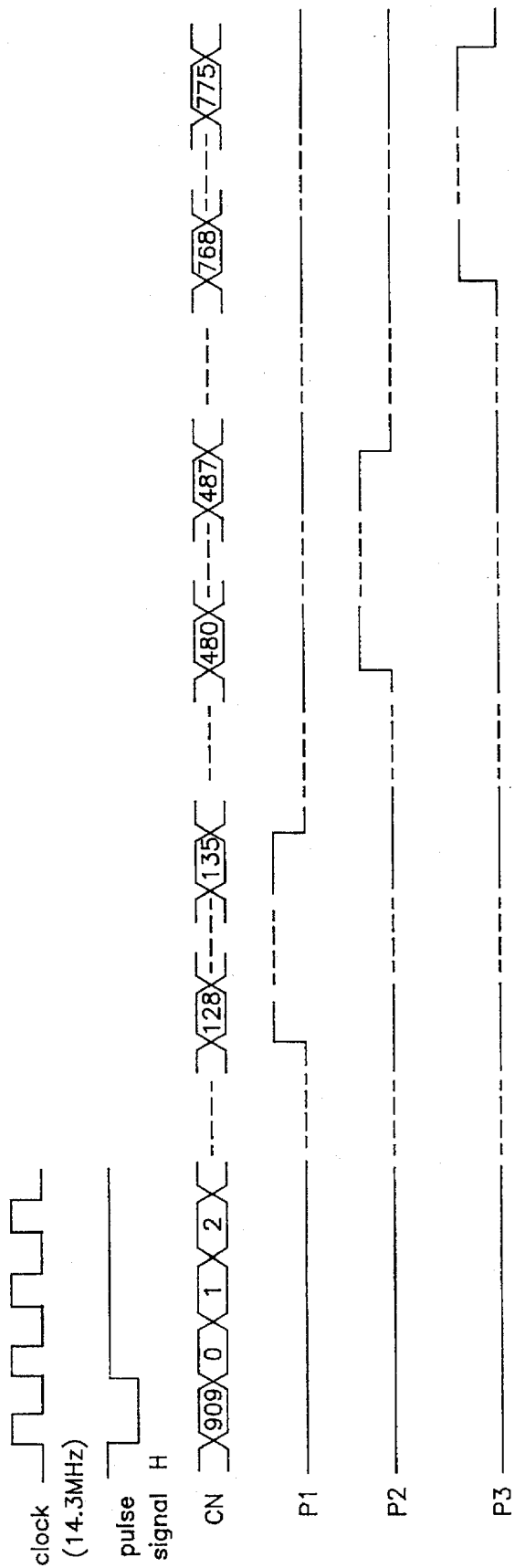
FIG. 3 is a timing chart of the control pulse generation circuit of the first embodiment of the invention.
Figure 4:
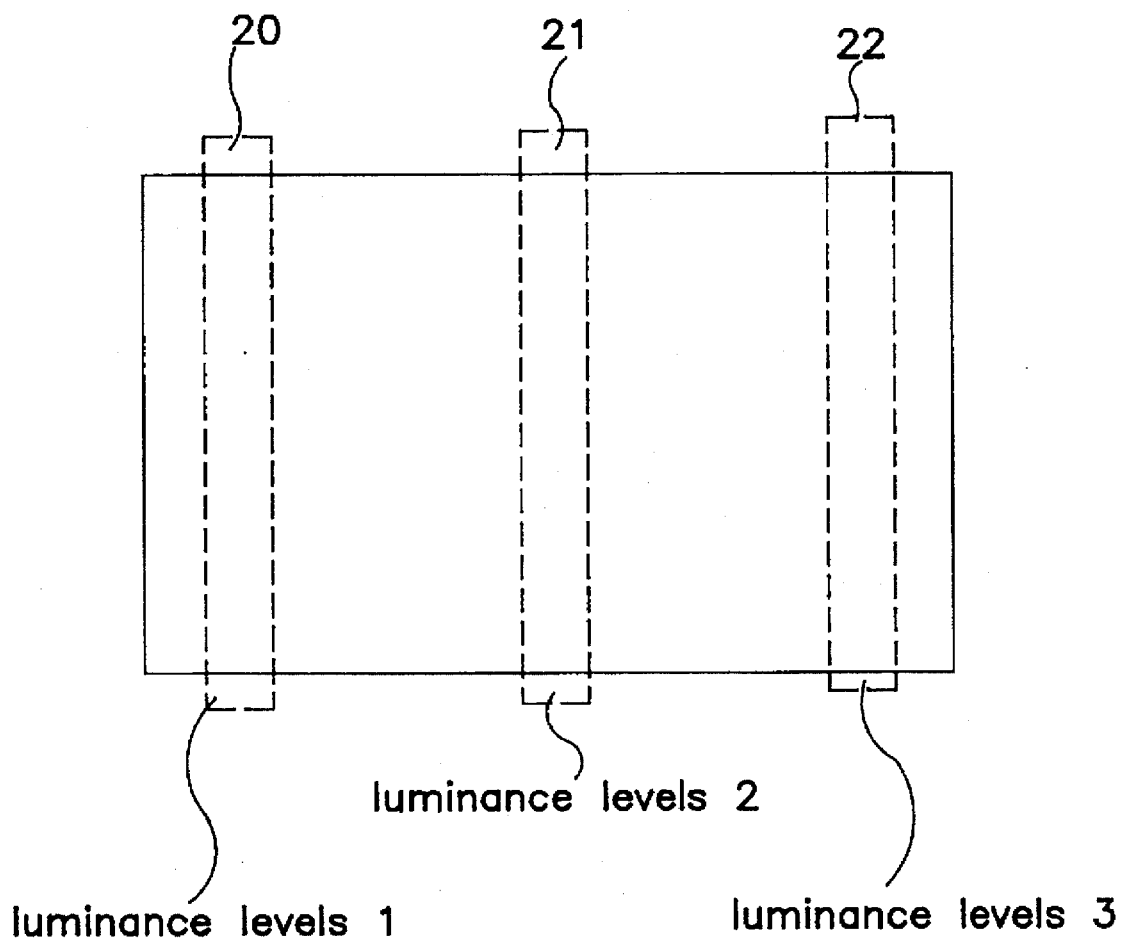
FIG. 4 is a drawing showing the sampling regions of a luminance signal in by the average luminance level detection apparatus of the first embodiment of the invention.

The performance of the average luminance level detection apparatus of the first embodiment constituted as above will be illustrated referring to FIG. 2, FIG. 3, and FIG. 4.

First, counter 1 counts clock pulses one by one from 0 using the pulse signal H synchronizing with a horizontal synchronizing signal as a reset input. When the clock frequency is 14.3 MHz, the counter counts from 0 to 909. Control pulse generation circuit 2 is input the count output CN of counter 1 and generates pulse signals P1, P2, and P3 which become high levels for certain periods respectively. In the case where a control pulse generation circuit 2 is constituted as shown in FIG. 2, the count output CN of counter 1 is first latched by flip-flop 16. The output of the flip-flop 16 is input to coincidence detection circuits 17, 18, and 19, and compared with reference count numbers A, B, and C respectively. When the output of flip-flop 16 coincides reference count numbers A, B, and C, coincidence detection circuits 17, 18, and 19 output high level signals respectively. When coincidence detection circuits 17, and 18, and 19 are constituted so that the widths of said high level signals become that of eight clock pulses, timing chart of control pulse generation circuit 2 is as shown in FIG. 3. Integration circuits 3, 4, and 5 perform integration only while the output P1, P2, and P3 of control pulse generation circuit 2 are in high level. By this performance, said integration circuits 3, 4, and 5 can integrate the luminance level only in a certain span of a horizontal scan period. Flip-flops 6, 7, and 8 reset the outputs Q1, Q2, and Q3 of the integration circuits 3, 4, and 5 at the top position of the picture and latch them at the bottom position of the picture utilizing a vertical synchronizing signal V. Division circuits 9, 10, and 11 divide the outputs T1, T2, and T3 of flip-flops 6, 7, and 8 by the sample numbers of integration by integration circuits 3, 4, and 5 and output average luminance level signals 28, 29, and 30 showing average luminance levels 1, 2, and 3.

As described above, average luminance levels 1, 2, and 3 of respective regions 20, 21, and 22 for the luminance signal of one field period can be detected as shown in FIG. 4. Here, the average luminance level detection regions are illustrated as three, but the number of regions is not limited to three, and the number of constituting circuits may change according to the number of regions.

2ND EMBODIMENT

Figure 5:
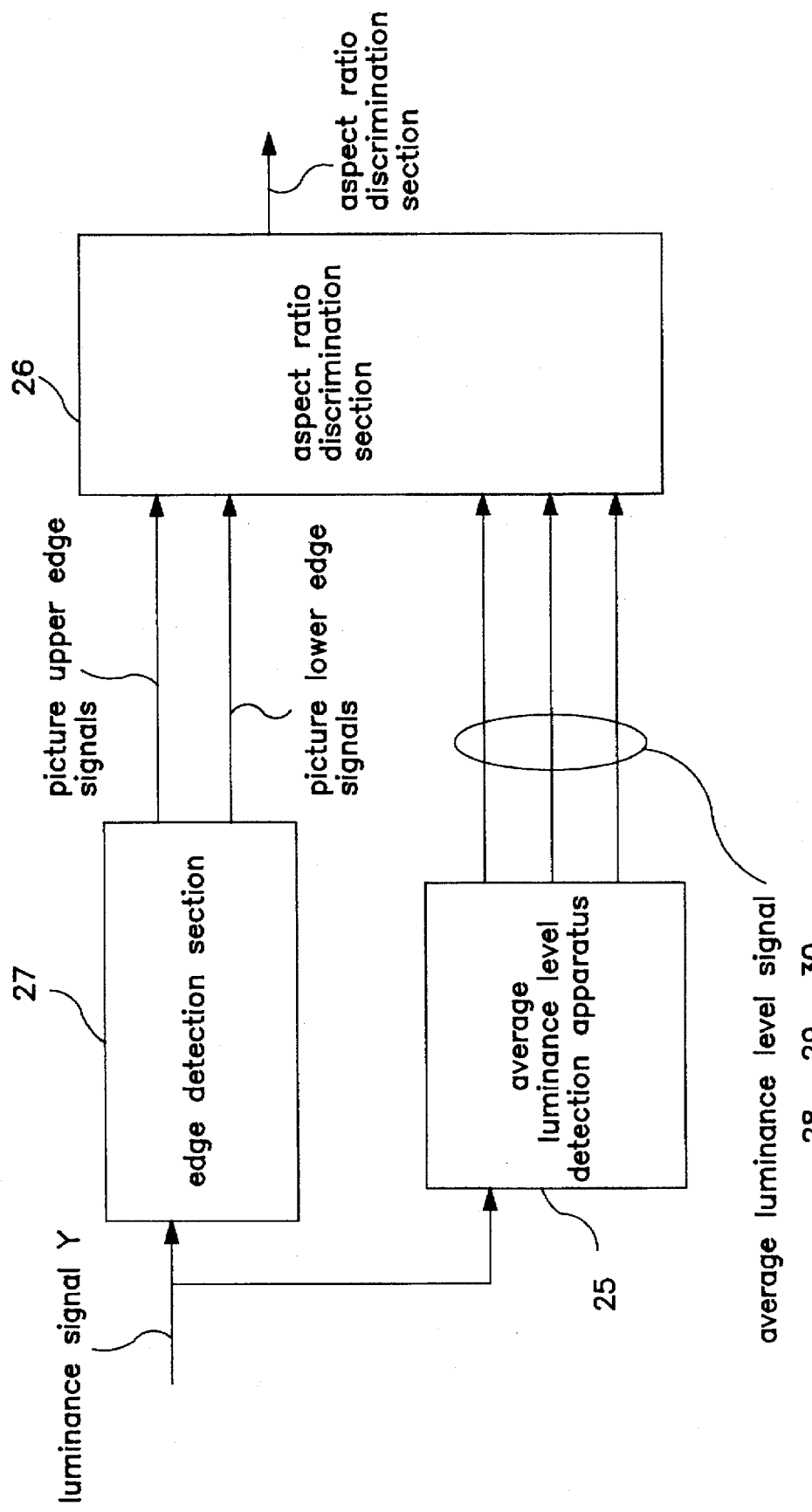
FIG. 5 is a block diagram of an aspect ratio-auto-discrimination apparatus as a second embodiment of the invention.
Figure 6:
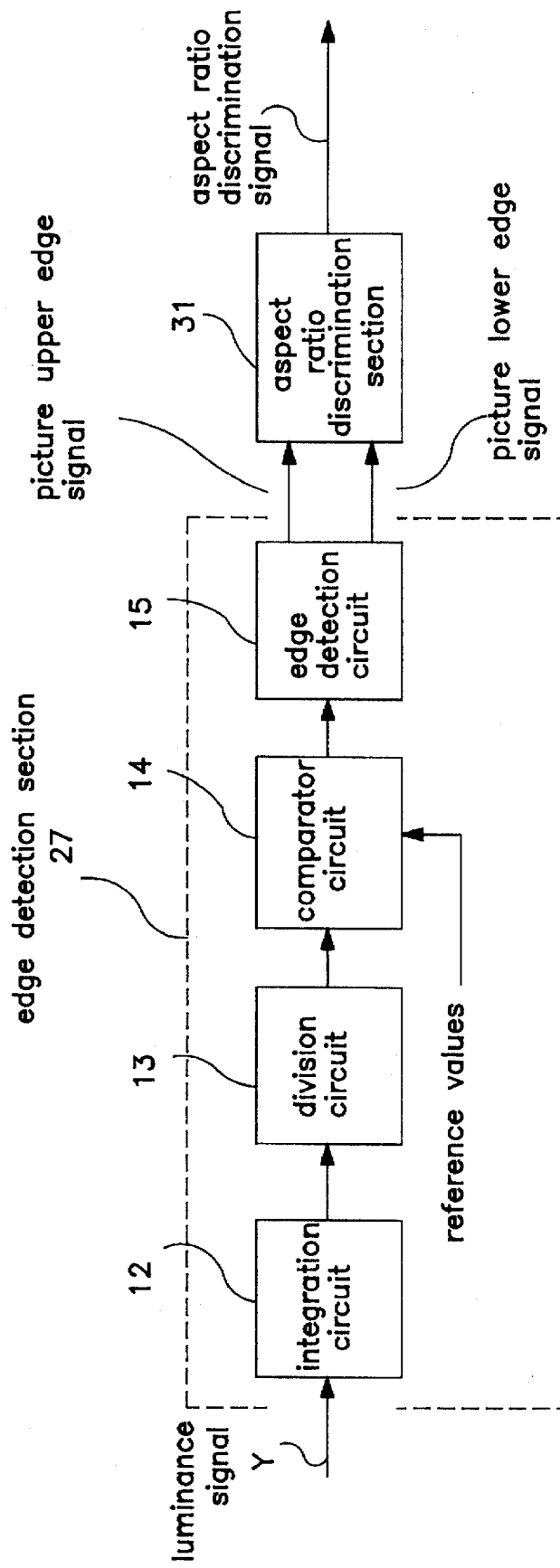
FIG. 6 is a block diagram of an aspect ratio auto-discrimination apparatus in the prior art.

An aspect ratio auto-discrimination apparatus which is a second embodiment of the invention will be illustrated referring to drawings. A block diagram of said aspect ratio auto-discrimination apparatus is shown in FIG. 5. Said aspect ratio auto discrimination apparatus comprises: an edge detection section 27 which is input a luminance signal Y and outputs picture upper edge and lower edge signals and has been used in conventional examples; an average luminance level detection apparatus 25 which is input the luminance signal Y and outputs average luminance level signals of a plurality of regions and was shown as the first embodiment; and an aspect ratio discrimination section 26 which is input the output of said edge detection section 27 and the output of said average luminance level detection apparatus 25 and outputs an aspect ratio discrimination signal.

Figure 7A:
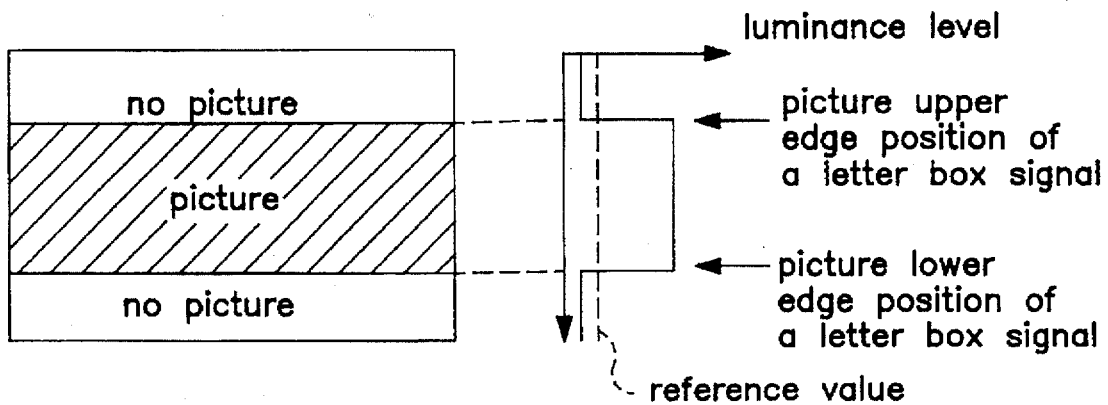
FIG. 7 (a) a drawing showing the luminance distribution and the picture upper edge and lower edge of a letter box signal. (b) a drawing showing the luminance distribution and the false picture upper edge and lower edge of a special signal of aspect ratio 4:3.
Figure 7B:
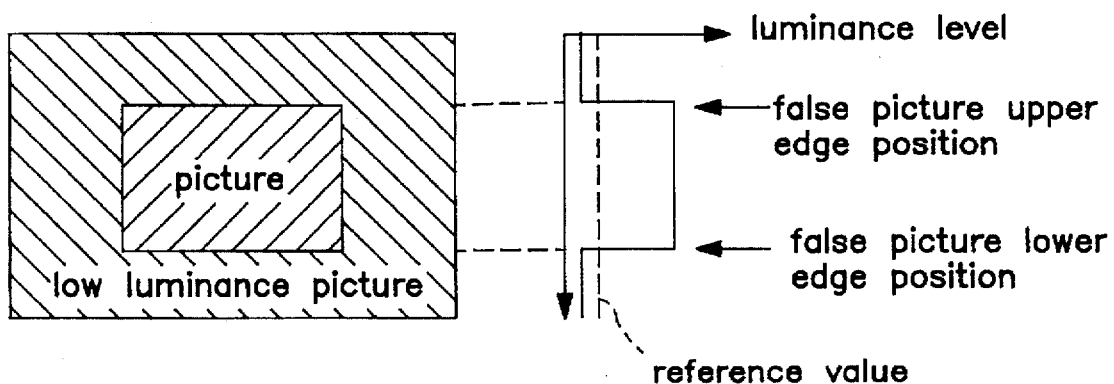

We set following is condition 1 where using said edge detection section 27, picture upper edge position 23 and picture lower edge position 24 shown in FIG. 7(a) are detected. Further we set following is condition 2 where all of average luminance level 1 of region 20 shown in FIG. 4 detected by average luminance level detection apparatus 25, average luminance level 2 of region 21, and average luminance level 3 of region 22, are intermediate between respective predetermined minimum reference values and maximum reference values. When both of the conditions are satisfied, the picture is discriminated as a wide aspect ratio, for example 16:9. When both of the conditions or one of them are not satisfied, the aspect ratio is discriminated as not wide aspect ratio, that is, the aspect ratio is discriminated as 4:3.

Next, as mentioned in the claim 4, When both of said condition 1 and condition 2, or one of them are not satisfied, the aspect ratio discrimination action is repeated. If the result shows both conditions are satisfied, that the aspect ratio is wider than 4:3, for example 16:9 can be discriminated.

Above is illustrated about an apparatus constitution and its method in which, based on a picture of aspect ratio 4:3, a wide picture such as of an aspect ratio 16:9 is discriminated though, the reverse is possible.

As illustrated above, in the present invention, by discriminating an aspect ratio using the upper edge position information and lower edge position information of the picture obtained from an aspect ratio auto detection apparatus in the prior art and the average luminance level information of the picture, the misjudge rate of the aspect ratio of a video signal which have no aspect discriminating signal can be lowered, and its practical effect is large.

What is claimed:

1. An average luminance level detection apparatus comprising:
    a counter to which a pulse signal H synchronizing with a horizontal synchronizing signal is input as a reset input;
    a control pulse generation circuit to which a count output CN of said counter is input;
    a first integration circuit to which a luminance signal Y and a first output P1 of said control pulse generation circuit are input;

a second integration circuit to which the luminance signal Y and a second output P2 of said control pulse generation circuit are input;

a third integration circuit to which the luminance signal Y and a third output P3 of said control pulse generation circuit are input;

a first flip-flop to which an output Q1 of said first integration circuit and a vertical synchronizing signal V as a trigger signal are input;

a second flip-flop to which an output Q2 of said second integration circuit and the vertical synchronizing signal V as the trigger signal are input;

a third flip-flop to which an output Q3 of said third integration circuit and the vertical synchronizing signal V as the trigger signal are input;

a first division to which an output T1 of said first flip-flop is input;

a second division circuit to which an output T2 of said second flip-flop is input; and, a third division circuit to which an output T3 of said third flip-flop is input.

2. An aspect ratio auto-discrimination apparatus comprising:

an integration circuit for integrating a luminance signal Y for one horizontal scan period;

a division circuit for dividing the value integrated by said integration circuit by the number of samples of the integration;

a comparator circuit for comparing the output of said division s circuit with a predetermined reference value;

an edge detection means including an edge detection circuit for detecting an upper edge and a lower edge of a picture by being input the compared information of said comparator circuit during one field period;

an average luminance level detection apparatus described in claim 1; and an aspect ratio discrimination means to which an output of said edge detection means and an output of said average luminance level detection apparatus are input.

3. The aspect ratio auto-discrimination apparatus of claim 2, wherein a picture upper edge position and a picture lower edge position except the top position and bottom position of the picture of a first aspect ratio are detected using said edge detection means is defined as condition 1, and that all of the outputs of the average luminance level detection apparatus of claim 1 are intermediate values between respectively predetermined minimum values and maximum values is defined as condition 2, when both of the conditions are satisfied, the aspect ratio of the picture is discriminated as a wider one than the first aspect ratio.

4. The aspect ratio auto-discrimination apparatus of claim 2, wherein a picture upper edge position and a picture lower edge position except the top position and bottom position of the picture of an aspect ratio 4:3 are detected using said edge detection means is defined as condition 1, and that all of the outputs of the average luminance level detection apparatus of claim 1 are intermediate values between respectively predetermined minimum values and maximum values is defined as condition 2, when both of the conditions are satisfied, the aspect ratio of the picture is discriminated as a wider one than the aspect ratio 4:3.

5. The aspect ratio auto-discrimination apparatus of claim 3, wherein when both the condition 1 and the condition 2 are not satisfied, the discriminating actions are repeated, and if both of the conditions are satisfied after the repeating, the aspect ratio is discriminated as a wider one than the first aspect ratio.

* * * * *

UNITED STATES PATENT AND TRADE MARK OFFICE
CERTIFICATE OF CORRECTION

PATENT NO. : 5,686,970
DATED : November 11, 1997
INVENTOR(S) : Tani et al.

It is certified that error appears in the above-identified patent and that said Letters Patent is hereby corrected as shown below:

On the cover page, item [56] References Cited, list the following:

4-207791  7/1992  Japan

Column 5, line 32, between "division" and "circuit" delete "s".

Signed and Sealed this

Fourteenth Day of April, 1998

Attest:

BRUCE LEHMAN

Attesting Officer

Commissioner of Patents and Trademarks